United States Patent [19]

Babel

[11] Patent Number: 4,575,291

[45] Date of Patent: Mar. 11, 1986

[54] DIVIDING APPARATUS FOR A PROGRAM CONTROLLED MACHINE TOOL

[75] Inventor: Werner Babel, Pfronten-Meilingen, Fed. Rep. of Germany

[73] Assignee: Maho Werkzeugmaschinenbau Babel & Co., Pfronten/Allgau, Fed. Rep. of Germany

[21] Appl. No.: 370,837

[22] Filed: Apr. 22, 1982

[30] Foreign Application Priority Data

May 7, 1981 [DE] Fed. Rep. of Germany ....... 3118141

[51] Int. Cl.[4] .............................................. B23C 9/00
[52] U.S. Cl. .................................. 409/222; 409/218; 29/48.5 A; 74/813 L
[58] Field of Search ............... 409/222, 221, 223, 224, 409/90, 80, 228, 220, 155, 218, 146, 225; 408/3, 225; 279/5; 74/409, 813 L; 82/28 R, 2 B; 188/71.1, 72.1, 72.4; 29/49, 48.5 A

[56] References Cited

U.S. PATENT DOCUMENTS

| | | | |
|---|---|---|---|
| 2,356,097 | 8/1944 | Stanley | 409/222 |
| 2,535,490 | 12/1950 | Emrick | 409/222 |
| 2,622,486 | 12/1952 | Roehm et al. | 409/228 |
| 2,687,197 | 8/1954 | Leifer | 82/28 R |
| 2,793,807 | 5/1957 | Yaeger | 409/80 |
| 2,972,912 | 2/1961 | Carlsen | 74/409 |
| 3,174,351 | 3/1965 | Spencer | 74/409 |
| 3,396,594 | 8/1968 | Walker | 74/409 |
| 3,443,481 | 5/1969 | Ramge | 409/222 |
| 3,458,881 | 8/1969 | Drechsler et al. | 408/3 |
| 3,651,900 | 3/1972 | Feikema | 188/72.4 |
| 3,704,449 | 11/1972 | Hutchins | 74/409 |
| 4,103,589 | 8/1978 | Francis | 409/223 |
| 4,279,180 | 7/1981 | Tomlinson et al. | 82/28 R |
| 4,303,360 | 12/1981 | Cayen et al. | 409/233 |
| 4,386,544 | 6/1983 | Fuminier | 82/101 |

*Primary Examiner*—Z. R. Bilinsky
*Assistant Examiner*—Thomas M. Kline
*Attorney, Agent, or Firm*—Kenway & Jenney

[57] ABSTRACT

The subject matter of the present invention is a dividing apparatus or indexing attachment for a program controlled machine tool, comprising a housing (1) including clamping means (3, 4) for attachment to a machine part, a dividing spindle (5) mounted within the housing (1) and including a work holder (8, 9) and a clamping assembly (15), and a spindle drive means including a reduction gearing, in which for achieving fully automatic sequences of operation in the manufacture of various workpieces, an opto-electronic angle measuring unit (24) and a releasable clamping means (31 to 36) are associated with the dividing spindle (5), wherein the reduction gearing includes two cylindrical gears (29, 30) having parallel axes and jointly meshing with a pinion (27) mounted on the motor shaft and further includes two pinions (46, 47) mounted on the intermediate shafts (40, 41) of said cylindrical gears, the two latter pinions meshing with the spindle drive gear (10).

3 Claims, 4 Drawing Figures

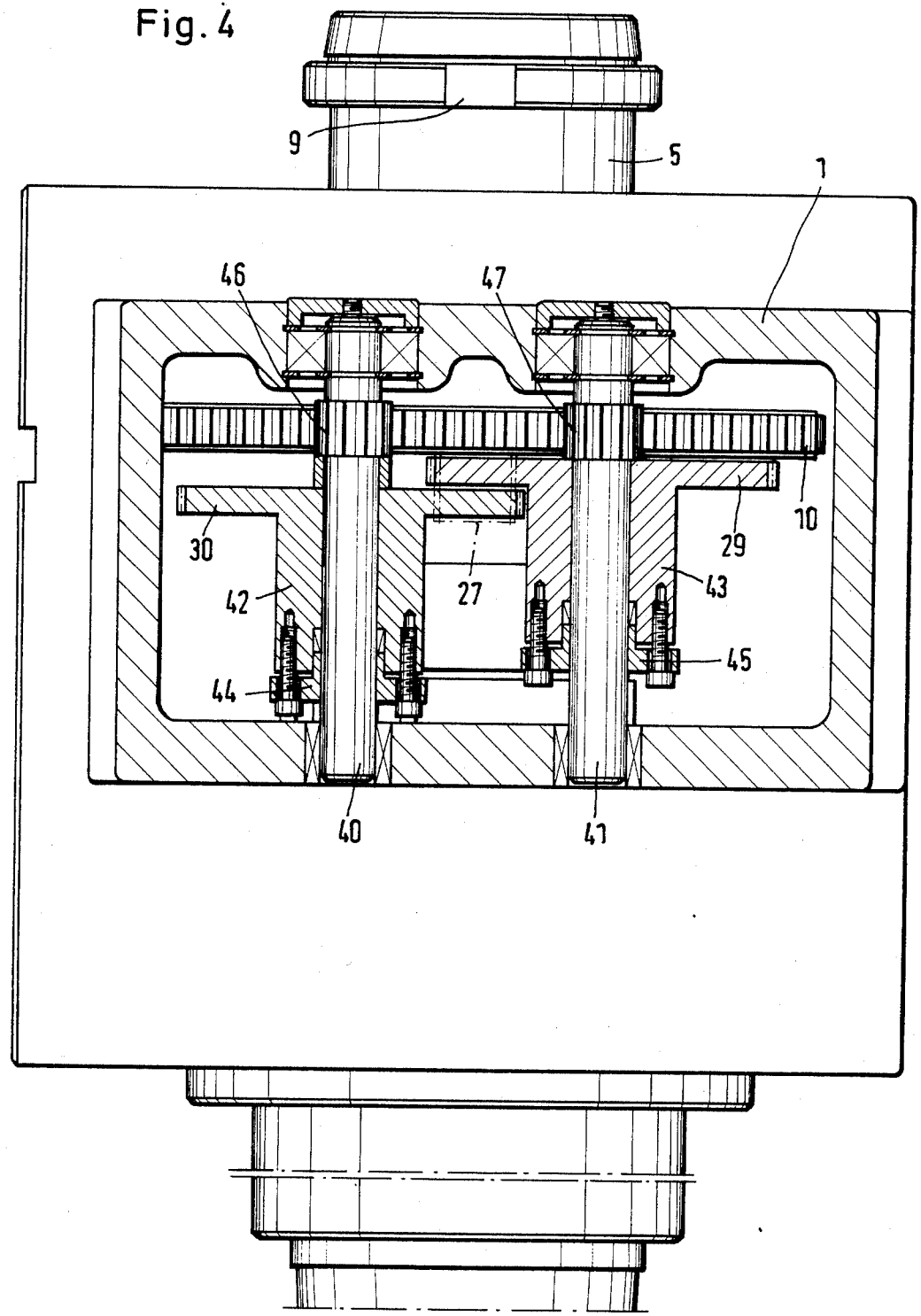

DIVIDING APPARATUS FOR A PROGRAM CONTROLLED MACHINE TOOL

The present invention relates to a dividing apparatus or indexing attachment for a program controlled machine tool, comprising a housing including clamping means for attachment to a machine part, a dividing spindle mounted within the housing and including work holding means, and a spindle drive including a reduction gearing.

Dividing apparatus or indexing attachments are employed for the manufacture of workpieces which are rotated either during or between the individual machining operations either continuously or by predetermined fixed angular distances.

A difference is made between direct, indirect and compensating division. The dividing apparatus presently used in practice all include a so-called dividing or apertured disk which is mounted either directly on the dividing spindle or on a separately driven rotary shaft. Both for indirect and for compensating division the dividing spindle is driven by a motor through a worm and a wormgear, the reduction ratio of the worm gearing in most cases being 40:1 or 50:1, respectively. The apertured disks are exchangeable and frequently are provided with a plurality of hole circles with different numbers of holes or apertures, said hole circles having the same centre, wherein the spacings between the holes of each individual hole circle are the identical.

Dividing apparatus or dividing heads of this type are provided on at least one outer surface of the housing with clamping means by which they may be mounted either on a work table or on vertical or horizontal carriages movable within the column.

The workpieces are fixed either with one end in a short taper collet or with both ends between the collet and a back centre mounted on a steady so as to be height-adjustable. When such known dividing heads are used in NC machine tools the apertured disks and/or dividing drums determining the respective division have been found to be disadvantageous, because particularly in case of job lot production and prototype production they have to be replaced manually, which is detrimental to a fully automatic sequence of operations.

It is the object of the present invention to provide a dividing apparatus or indexing attachment of the type specified above, which permits a fully automatic sequence of operations for the production of a variety of workpieces.

In accordance with the present invention the above-specified object is solved in that an opto-electronic angle measuring unit and a releasable clamping device are associated with the dividing spindle.

The angle measuring unit employed may be a device whose rotatable member, which bears markings, is coupled to the dividing spindle either directly or, respectively, through an elastic coupling. A stationary opto-electronic signal pick-up is connected to the NC control unit. The function of fixing the dividing spindle, which in known dividing heads is performed by the apertured disk or by the dividing drum, is taken over according to the invention by a clamping or locking assembly which may either engage the outer periphery of the spindle or may engage with a member drivingly connected to said spindle.

Since the dividing apparatus according to the present invention is to be used in numerically controlled universal milling machines, a particularly low-friction spindle drive train is required. Since, as is well known, the worm gearings used so far have relatively high coefficients of friction, the present invention employs a clearance-compensated cylindrical gearing which comprises two driving pinions mounted on intermediate shafts, which pinions jointly mesh with a cylindrical gear mounted on the spindle.

In accordance with an advantageous further embodiment of the invention the reduction gearing comprises two cylindrical gears, which have parallel axes and jointly mesh with a motor shaft pinion, as well as two pinions mounted on the shafts of said cylindrical gears, which two pinions mesh with the spindle drive gear. Each of said two cylindrical gears with parallel axes is integrally formed with a bushing the free end of which is clamped onto the respective intermediate shaft and the length and mechanical properties of which have been chosen such that both of them cooperate to effect the desired clearance compensation.

In accordance with a suitable further development of the present invention the cylindrical drive gear is mounted on the continuous cylindrical outer surface of the dividing spindle, and the clamping and fixing means is designed such that the clamping action is effective between the two radial surfaces of this cylindrical gear. For this purpose the clamping means comprise at least one hydraulically actuated clamping cartridge floatingly mounted within the housing on one side of the spindle drive gear, the movable member of said cartridge being coupled to a thrust piece mounted so as to be longitudinally movable within the housing on the other side of the spindle drive gear.

For universal application of the invention a collet disposed in the interior of the dividing spindle may be provided with a central threaded bore for releasably receiving a rod and may be fixedly coupled to the piston rod of a bidirectionally acting hydraulic clamping cylinder so as to automatically fix the workpieces.

Thus it becomes possible also to integrate into the control the operations for fixing the workpieces—particularly in case of automatic workpiece advance.

A special advantage of the dividing apparatus of the invention resides in that it is possible to mount on the spindle portion which projects from the housing externally engaging face plates, table plates and/or chucks, whereby the dividing apparatus according to the present invention also satisfies the function of a turntable for machining small-sized workpieces; in this connection it is ensured by the opto-electronic measuring unit and the clearance-free drive means that any desired division may be set with extreme precision and may also be maintained.

An embodiment of the invention will be described in detail with reference to the accompanying drawing, in which:

FIG. 4 is a partial sectional view of the reduction gearing used in the dividing apparatus shown in FIG. 1.

Figure 1:
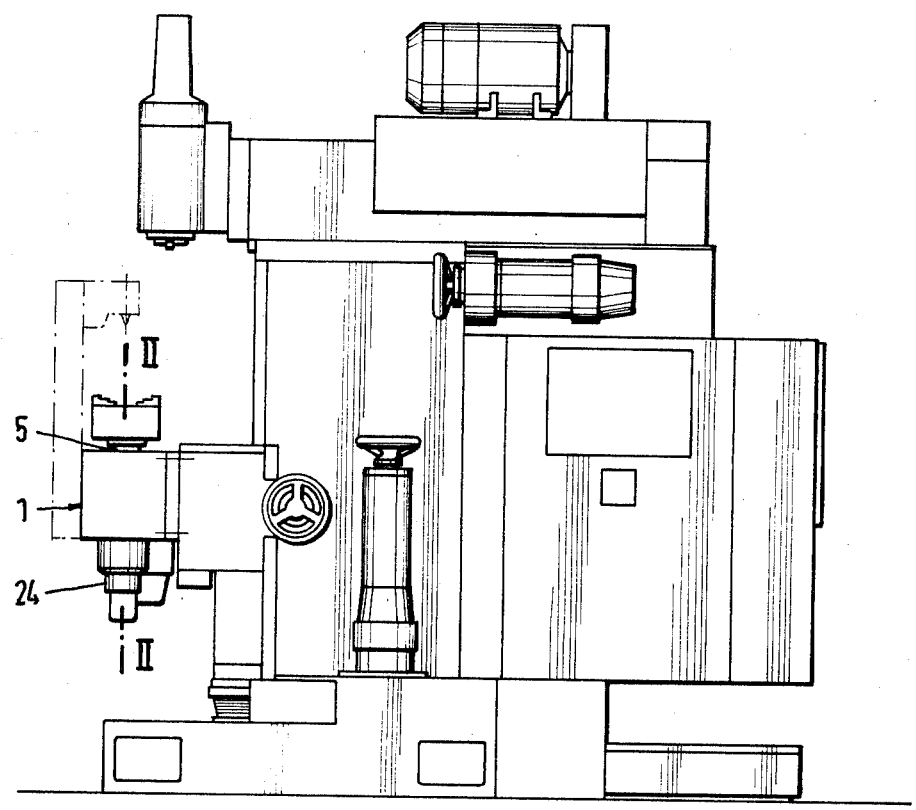
FIG. 1 is a general view of the dividing apparatus mounted on a universal milling machine.

The dividing apparatus or indexing attachment shown in the drawing is designed for attachment to a vertical carriage or a work table of a universal milling machine. A housing 1 is provided on at least two outer surfaces with usual longitudinal grooves or bolt receptacles 3, 4 by means of which the dividing apparatus may be mounted to the respective machine part and a steady including a back centre for the workpieces may be secured. A spindle 5 is rotatably mounted in the housing 1 in roller bearings 6, 7, the spindle end projecting from the housing 1 being provided with a tool quick-release taper 8 and with external driving grooves 9. Onto the smooth outer surface of the central portion of the dividing spindle 5 there is clamped a cylindrical drive gear 10 by means of a clamping ring 11 and wedge members 12 which engage in an annular recess formed between the outer surface of the dividing spindle 5 and an annular flange 13 of the cylindrical drive gear. Extending from the quick-release taper 8 is a multi-stepped cylindrical inner space 14 in which a work fixture 15 is disposed so as to be longitudinally movable. An actuating member 16 for a collet 17 is fixedly coupled to the piston rod 18 of a bidirectionally acting clamping cylinder 19 formed in the rear portion of the spindle and being sealed by an end plug 20. Inside of this plug 20, which is fixedly threaded onto the spindle 5, there is secured the output portion 21 of an elastic, torsionally rigid coupling 22 the input portion 23 of which is fixedly coupled to the rotary member of an opto-electronic measuring unit 24. The measuring unit 24 is provided with a scale made, for instance, of glass which is secured to the rotary member and has markings thereon; the unit 24 is further provided with an opto-electronic reading head which is connected to the program control of the machine tool.

Figure 3:
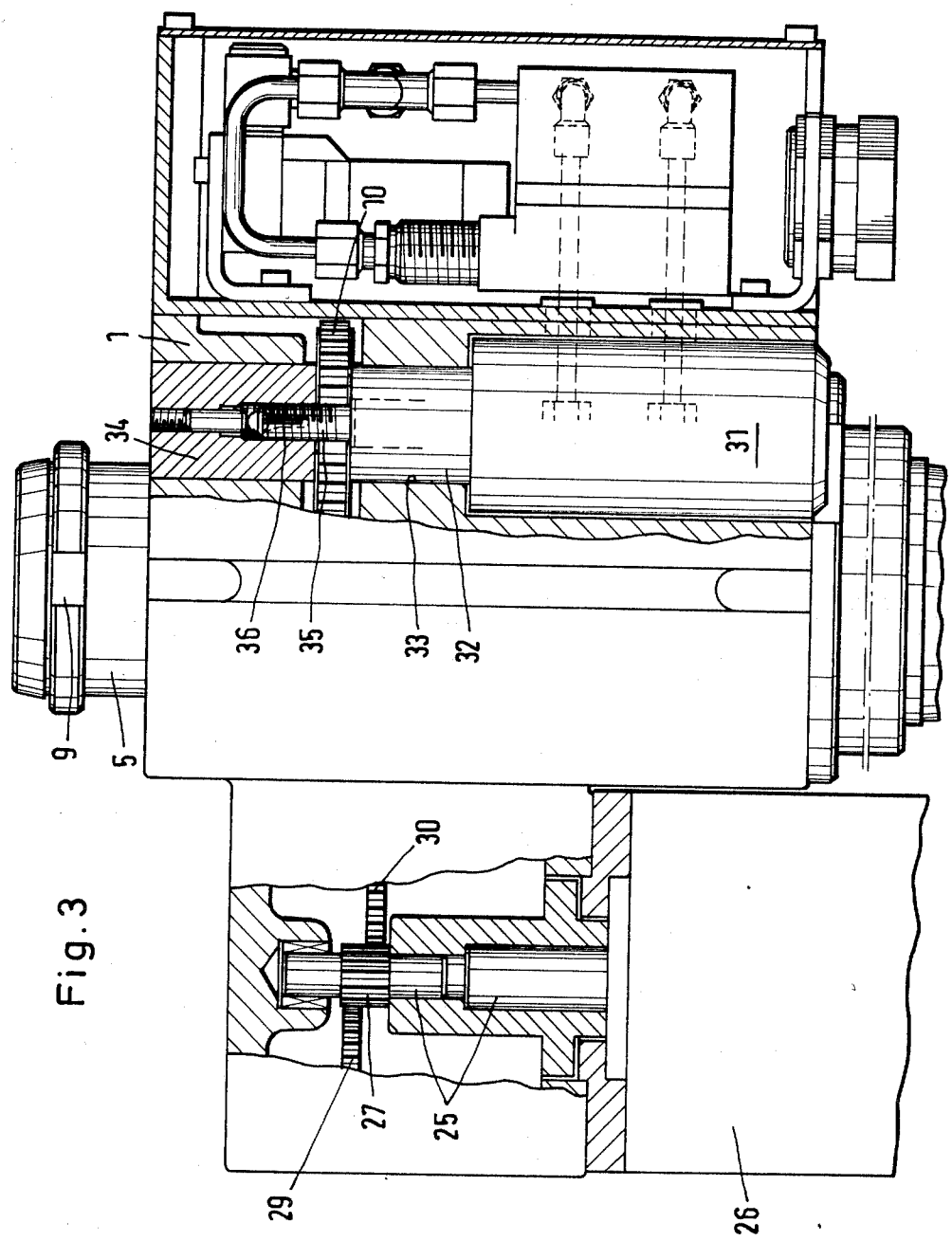
FIG. 3 is a partial sectional view of the dividing apparatus of FIG. 1, showing the arrangement of the clamping means and of the drive motor.

As will be apparent from the left-hand portion of FIG. 3, a relatively wide pinion 27 is splined to the output shaft 25 of an electric motor 26 the speed of rotation of which is infinitely variable between 0 and 2000 r.p.m.; the pinion 27 is disposed centrally between two cylindrical gears 29, 30 shown in FIG. 4 and is continually in engagement therewith.

The right-hand part of FIG. 3 shows the clamping means in a partially sectional view. This clamping means comprises a clamping cartridge 31 floatingly mounted within the housing; the cylindrical end portion 32 of the cartridge 31 is guided for longitudinal movement and free from play in a recess 33 formed in the housing 1. A thrust piece 34 is mounted within an extension of the cylindrical housing recess 33 so as to be axially movable; the thrust piece 34 is fixedly coupled to the plunger 35 of the clamping cartridge 31 by means of a screw bolt and a ball-type clamping 36, the plunger 35 being axially movable relative to the end portion 32. The spindle drive gear 10 is disposed between the end faces of the cylindrical end portion 32 and of the thrust piece 34. In order to achieve an improved distribution of the clamping forces acting on this drive gear 10, two respective clamping cartridges 31 are disposed symmetrically with respect to the central axis of the dividing spindle, wherein the cartridges 31 are respectively jointly hydraulically actuated and released.

The reduction gearing shown in axial section in FIG. 4 is a cylindrical gearing with clearance compensation and includes two intermediate shafts 40, 41 with parallel axes, the shafts being mounted at either end in respective transverse walls of the housing 1. Each of the cylindrical gears 29, 30 is fixedly clamped onto a respective one of said intermediate shafts 40 and 41, respectively, and is provided for this purpose with an integrally formed sleeve 42, 43 the ends of which are engaged by a corresponding wedge-type clamping means 44 and 45, respectively. Since in this way merely the ends of the sleeves are fixed to the intermediate shafts 40, 41 by frictional coupling, the tooth gearings of the cylindrical gears 29, 30, which are jointly interengaged with the double-width pinion 27, may be slightly offset relative to one another so as to compensate for gear play, while excessive loads on the respective teeth are avoided.

Figure 2:
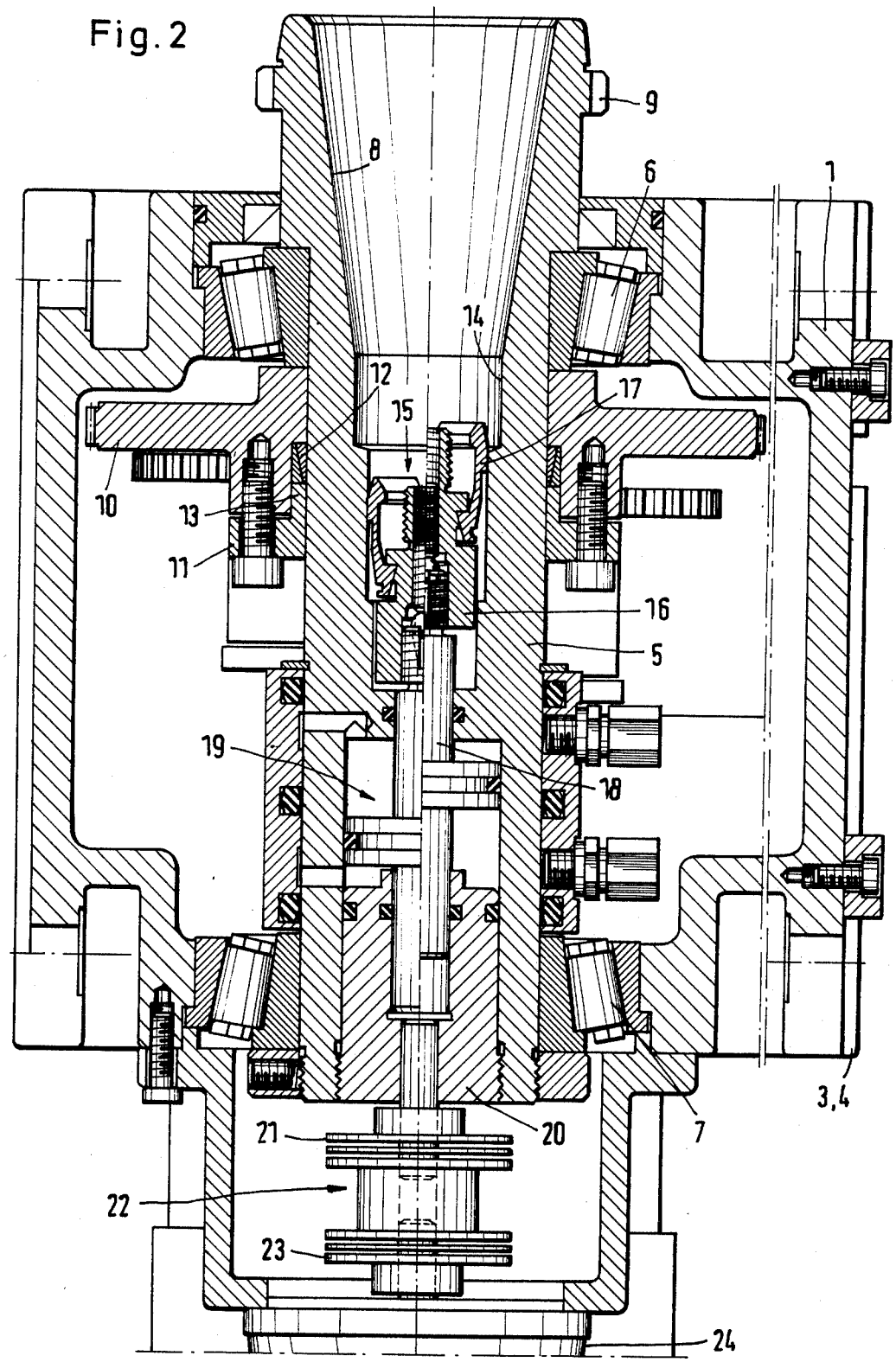
FIG. 2 is an axial sectional view of the dividing apparatus along the line II—II of FIG. 1.

Immediately adjacent the left-hand face (as seen in FIG. 4) of the cylindrical gear 29 there are secured a respective pinion 46, 47 on each of the intermediate shafts 40, 41, said pinions being in joint interengagement with the spindle drive gear 10 shown in detail in FIG. 2.

The dividing apparatus as described above operates as follows:

By actuation of the clamping cylinder 19 a work holder, a face plate, a table plate or a chuck is fixedly clamped and centered by means of the collets 17 or by means of a threaded member inserted into the central bore of the actuating piece 16. Zeroing is effected by a signal supplied to the electric motor 26 from the NC unit, whereupon the motor starts at low speed of rotation and turns the spindle at the reduction ratio determined by the cylindrical gearing until the opto-electronic measuring head has recorded the zero position of the scale. Thereupon the electric motor is turned off, and hydraulic fluid is supplied to the two clamping cartridges 31 so that the spindle drive gear 10 and the spindle itself will be fixedly clamped.

Thereupon the fixed workpiece may be machined in the usual way. After termination of the machining operation the NC unit again supplies a start signal for releasing the clamping engagement and for starting the electric motor 26, which initiates a corresponding rotation of the spindle, wherein the direction and the magnitude of such rotation is continually monitored by the measuring means 24. As soon as the division determined in the program control is reached the measuring means 24 supplies a corresponding pulse to the control unit which thereupon turns off the electric motor and effects engagement of the previously released clamping means by means of corresponding commands to the solenoid valves. Then, the second maching operation may be performed.

For machining helical grooves in cylindrical or conical workpieces the spindle 5 in the dividing apparatus according to the present invention may also be continuously driven at a speed of rotation which is determined by the machining velocity and the groove pattern.

What is claimed is:

1. A dividing apparatus for a machine tool having a program control unit which includes an electro-optically acting angle measuring unit comprising a housing including clamping means for attachment to a machine part, a dividing spindle mounted in said housing and including work holding means and a clamping unit, drive means including a spindle drive gear and reduction gearing for said dividing spindle, and a releasable fixing device for said dividing spindle, said fixing device (31 to 36) and said electro-optically acting angle measuring unit (24) being connected to said program control unit, said fixing device (31 to 36) comprising at least one hydraulic clamping cartridge (31) which is floatingly disposed within said housing (1) on one side of said spindle drive gear (10), said clamping cartridge (31) including a plunger member (35) being axially movable with respect to said clamping cartridge and fixedly coupled to a thrust piece (34) mounted in a longitudinally movable manner on the other side of said spindle drive gear (10) within said housing whereby the thrust piece (34) and the clamping cartridge (31) are drawn together when the clamping cartridge (31) is activated to retract the plunger member (35) thereby to clamp the spindle drive gear (10) between the clamping cartridge (31) and the thrust piece (34), and said reduction gearing including two cylindrical gears (29, 30) having parallel axes and jointly meshing with a motor shaft pinion (27) and two pinions (46, 47) mounted on intermediate shafts (40, 41) of said cylindrical gears, both of said pinions (46, 47) meshing with said spindle drive gear (10).

2. A dividing apparatus as defined in claim 1 wherein said electro-optically acting angle measuring unit (24) includes a rotatable member, said apparatus further comprising an elastic coupling (22) fixedly coupling said rotatable member to said dividing spindle (5).

3. A dividing apparatus as defined in claim 1 or claim 2 and further comprising a collet (17) and a bidirectionally acting hydraulic clamping cylinder (19) disposed in aligned relationship within said dividing spindle, said hydraulic clamping cylinder including a piston rod (18) fixedly coupled to said collet and said collet having an article-receiving central bore formed therein.

* * * * *